(12) United States Patent
Sakurai (10) Patent No.: US 10,676,308 B2
(45) Date of Patent: Jun. 9, 2020

(54) CUTTING APPARATUS AND ROTARY BLADE

(71) Applicant: TOYOTA JIDOSHA KABUSHIKI KAISHA, Toyota-shi, Aichi-ken (JP)

(72) Inventor: Takahiro Sakurai, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 43 days.

(21) Appl. No.: 15/935,287

(22) Filed: Mar. 26, 2018

(65) Prior Publication Data

US 2018/0282105 A1 Oct. 4, 2018

(30) Foreign Application Priority Data

Mar. 28, 2017 (JP) .................. 2017-063812

(51) Int. Cl.
 *B65H 35/04* (2006.01)
 *B26D 1/24* (2006.01)
 (Continued)

(52) U.S. Cl.
 CPC ............. *B65H 35/08* (2013.01); *B65H 35/02* (2013.01); *H01M 4/133* (2013.01); *H01M 4/139* (2013.01);
 (Continued)

(58) Field of Classification Search
 CPC . B26D 1/01; B26D 1/015; B26D 1/12; B26D 1/125; B26D 1/14; B26D 1/141; B26D 1/143–1535; B26D 1/24; B26D 1/245; B26D 1/0006; B26D 2001/002; B26D 2001/0046; B26D 2001/0053; B26D 1/157–185; B26D 2007/005; B26D 2007/0068; B26D 2001/0066; B65H 35/0006; B65H 35/0073; B65H 35/008; B65H 35/0086; B65H 35/02; B65H 35/04; B65H 35/08; B65H 2301/51532; B65H 2301/515323; B65H 2301/515; B65H 2301/326; B65H 2801/72; B41J 11/66; B41J 11/663; B41J 11/666; B41J 11/68;
 (Continued)

(56) References Cited

U.S. PATENT DOCUMENTS 3,768,712 A * 10/1973 Imbert .................. A24B 7/06
225/3
3,956,917 A * 5/1976 Kerseg ................. H01R 43/16
72/337
(Continued)

FOREIGN PATENT DOCUMENTS

GB         195021      * 3/1923 ............. B32D 19/04
JP     2010-238490 A    10/2010
(Continued)

*Primary Examiner* — Evan H MacFarlane
(74) *Attorney, Agent, or Firm* — Sughrue Mion, PLLC (57) ABSTRACT

Each of a first rotary blade and a second rotary blade includes a rough surface portion and a smooth surface portion. The rough surface portion has a predetermined width from a blade edge at its circumferential edge portion and has an arithmetical mean roughness of greater than 0.5. The smooth surface portion is provided radially inward of the rough surface portion and has an arithmetical mean roughness less than the arithmetical mean roughness of the rough surface portion.

5 Claims, 8 Drawing Sheets

(51) Int. Cl.
*B65H 35/08* (2006.01)
*H01M 4/1391* (2010.01)
*H01M 10/0525* (2010.01)
*H01M 4/133* (2010.01)
*B65H 35/02* (2006.01)
*H01M 4/139* (2010.01)
*H01M 10/052* (2010.01)

(52) U.S. Cl.
CPC ..... *H01M 4/1391* (2013.01); *H01M 10/0525* (2013.01); *B26D 1/24* (2013.01); *B65H 2301/515323* (2013.01); *B65H 2301/515326* (2013.01); *B65H 2801/72* (2013.01); *H01M 10/052* (2013.01)

(58) Field of Classification Search
CPC ......... B41J 11/70; B41J 11/703; B41J 11/706; Y10T 83/6592; Y10T 83/9403; Y10T 83/9447; Y10S 83/903; B23D 35/001
USPC ..... 83/426, 676, 694, 903; 30/347, 350, 357
See application file for complete search history.

(56) References Cited

U.S. PATENT DOCUMENTS

| | | | | |
|---|---|---|---|---|
| 5,423,239 | A | * | 6/1995 | Sakai .................. B26D 1/0006 83/345 |
| 5,836,229 | A | * | 11/1998 | Wakayama ............... B24B 3/08 83/886 |
| 7,975,589 | B2 | * | 7/2011 | Maekawa .............. B28D 1/225 83/886 |
| 2006/0016308 | A1 | * | 1/2006 | Katai .................. B26D 1/0006 83/318 |
| 2010/0035088 | A1 | * | 2/2010 | Inoue .................... B26D 1/245 428/846 |
| 2010/0151780 | A1 | * | 6/2010 | Gagliardi, Jr. ....... A22C 11/001 452/149 |
| 2010/0243788 | A1 | * | 9/2010 | Oku .................... B65H 23/038 242/525 |
| 2012/0174721 | A1 | * | 7/2012 | Yamamoto ........ A61F 13/15723 83/78 |
| 2015/0107572 | A1 | | 4/2015 | Fujita et al. |

FOREIGN PATENT DOCUMENTS

| | | | | |
|---|---|---|---|---|
| JP | 2015-9350 A | | 1/2015 | |
| KR | 100603586 | * | 7/2006 | ................ B24B 3/46 |
| KR | 10-2016-0021903 A | | 2/2016 | |
| WO | WO-2013129082 A1 | * | 9/2013 | ........... B26D 1/0006 |

\* cited by examiner

CUTTING APPARATUS AND ROTARY BLADE

CROSS REFERENCE TO RELATED APPLICATIONS

The present application claims priority from Japanese Patent Application No. 2017-063812 filed on Mar. 28, 2017, which is incorporated by reference herein in its entirety.

BACKGROUND OF THE INVENTION

1. Field of the Invention

The present invention relates to a cutting apparatus and a rotary blade.

2. Description of the Related Art

JP 2010-238490 A discloses a method for manufacturing an electrode plate for a lithium secondary battery, which uses a slitter equipped with two rotary blades including a first blade and a second blade. Each of the first blade and the second blade has a blade edge coated with a diamond-like carbon (DLC) film with a thickness of 0.5 μm to 2.0 μm. Such a cutting blade for slitter, which has a coating film made of a diamond-like carbon film, does not require a lubricant when cutting an electrode plate for a lithium secondary battery, and improves wear resistance. As a result, the cutting blade is said to be able to obtain a good cutting surface.

SUMMARY OF THE INVENTION

Between two rotary blades of the slitter, a clearance is provided in order to prolong the life of the rotary blades of the slitter. When the clearance is too narrow, the rotary blades may come into contact with each other, or the friction against the rotary blades may increase. For this reason, in order to prolong the life of the rotary blades, it is desirable to provide an appropriate clearance between the two rotary blades. The clearance is set to be such that an electrode sheet can be cut smoothly. As long as the clearance is such that the electrode sheet can be cut smoothly, the wider the clearance that can be set, the greater the tolerance for variations of the clearance due to vibrations or the like, and accordingly, the higher the robustness of the splitter. On the other hand, an electrode sheet used for, for example, lithium-ion secondary batteries uses a thin metal foil with a thickness of about 10 μm to about 15 μm, both faces of which has an active material particle layer formed thereon. In another type of electrode sheet, a separator made of resin is laminated further on the active material particle layer. Particularly when cutting such an electrode sheet in which a separator made of resin is laminated further on the active material particle layer, the separator easily flows into the clearance between the two rotary blades. When the separator flows into the clearance between the two rotary blades, it may cause defective cutting.

A cutting apparatus proposed herein includes a first rotary blade, a second rotary blade, a drive device, and a conveyor device. The first rotary blade is in a disk shape, and includes a rotary shaft provided at its center and a blade formed at its circumferential edge portion. The second rotary blade is in a disk shape, and includes a rotary shaft provided at its center and a blade formed at its circumferential edge portion. The drive device retains and rotates the first rotary blade and the second rotary blade so that the rotary shaft of the first rotary blade and the rotary shaft of the second rotary blade are aligned parallel to each other and the circumferential edge portions partially overlap with each other as viewed in an axis direction of the rotary shaft of the first rotary blade. The conveyor device feeds a work material toward a lap portion in which the circumferential edge portion of the first rotary blade and the circumferential edge portion of the second rotary blade partially overlap.

Each of the first rotary blade and the second rotary blade includes a rough surface portion and a smooth surface portion, the rough surface portion having a predetermined width from a blade edge of the respective circumferential edge portion and having an arithmetical mean roughness of greater than 0.5, and the smooth surface portion provided radially inward of the rough surface portion and having an arithmetical mean roughness less than the arithmetical mean roughness of the rough surface portion. In this cutting apparatus, the rough surface portion is provided at the respective circumferential edge portions of the first rotary blade and the second rotary blade. This serves to prevent defective cutting, and it is possible to provide an appropriate clearance.

It is also possible that the rough surface portion may be roughened by a blasting process. It is also possible that a radial width of the rough surface portion may be less than a maximum radial width of the lap portion in which the circumferential edge portion of the first rotary blade and the circumferential edge portion of the second rotary blade partially overlap. It is desirable that the smooth surface portion have an arithmetical mean roughness of less than 0.2, for example. It is also possible that the smooth surface portion may include a diamond-like carbon film formed thereon. When the diamond-like carbon film is formed on the smooth surface portion, foreign objects such as cuttings do not easily adhere to the smooth surface portion.

It is also possible that the first rotary blade and the second rotary blade may rotate in the same direction as a direction in which the work material is fed to the lap portion, and a peripheral speed of the first rotary blade and the second rotary blade may be faster than a speed at which the work material is fed to the lap portion.

A disk-shaped rotary blade proposed herein includes a rotary shaft provided at its center and a blade edge formed at its circumferential edge portion, the rotary blade including: a rough surface portion having a predetermined width from the blade edge of the circumferential edge portion and having an arithmetical mean roughness of greater than 0.5; and a smooth surface portion provided radially inward of the rough surface portion and having an arithmetical mean roughness less than the arithmetical mean roughness of the rough surface portion. Such a rotary blade is unlikely to cause defective cutting.

Here, it is also possible that the rough surface portion be roughened by a blasting process. It is also possible that the smooth surface portion have an arithmetical mean roughness of less than 0.2. It is also possible that the smooth surface portion may include a diamond-like carbon film formed thereon.

DETAILED DESCRIPTION OF THE PREFERRED EMBODIMENTS

Hereinbelow, embodiments of a cutting apparatus proposed herein will be described. It should be noted that the embodiments described herein are, of course, not intended to limit the present invention. The present invention is not limited to the embodiments described herein unless specifically stated otherwise.

Figure 1:
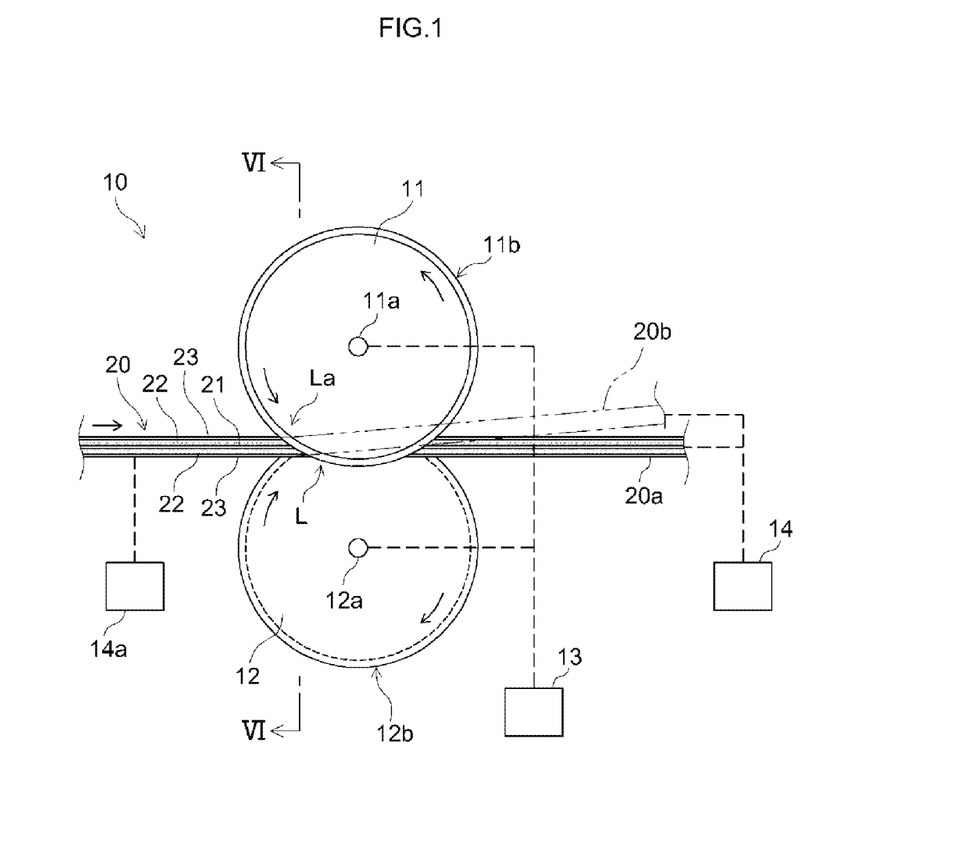
FIG. 1 is a side view illustrating a cutting apparatus 10 proposed herein.
Figure 2:
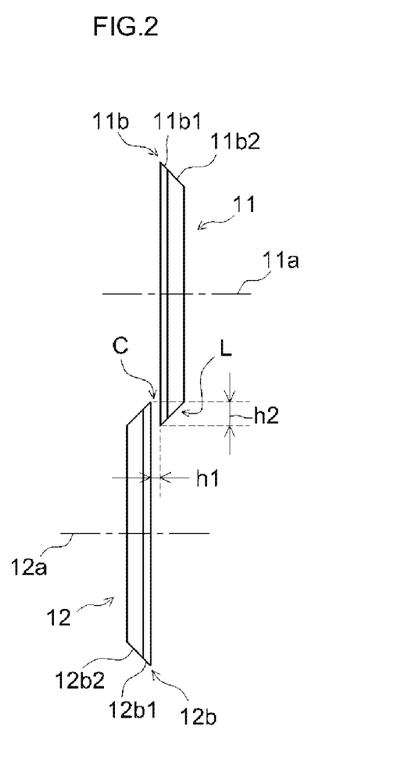
FIG. 2 is a front view illustrating an arrangement of a first rotary blade 11 and a second rotary blade 12.
Figure 3:
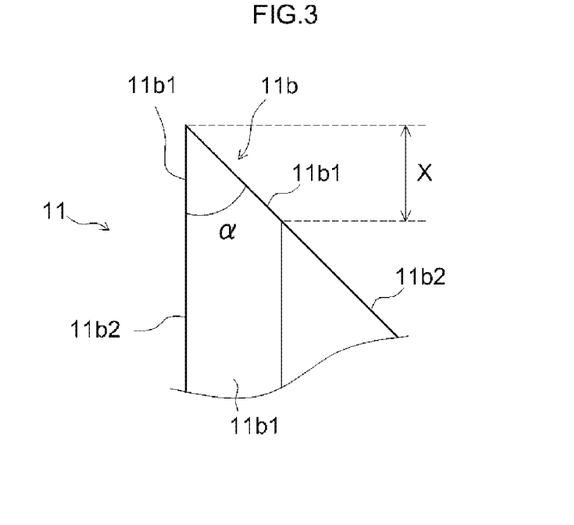
FIG. 3 is a partially enlarged cross-sectional view illustrating a circumferential edge portion 11b (blade edge) of the first rotary blade 11.
Figure 4:
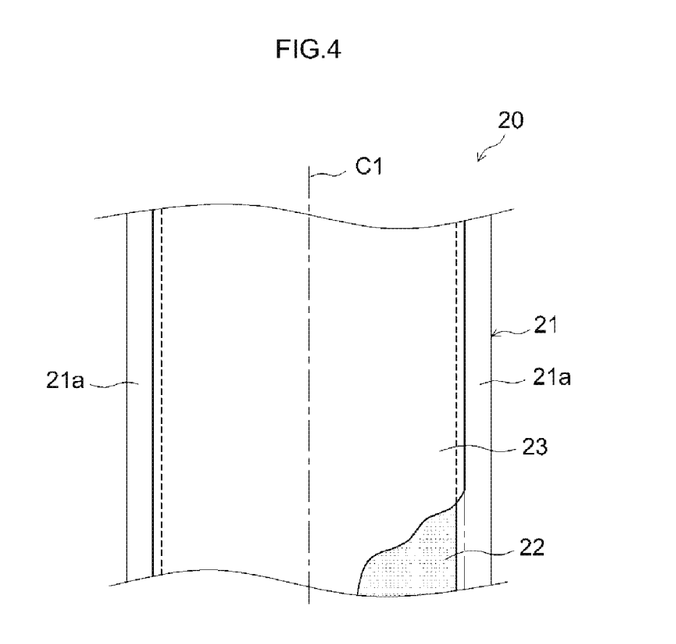
FIG. 4 is a plan view of an electrode sheet 20 that is to be cut.
Figure 5:
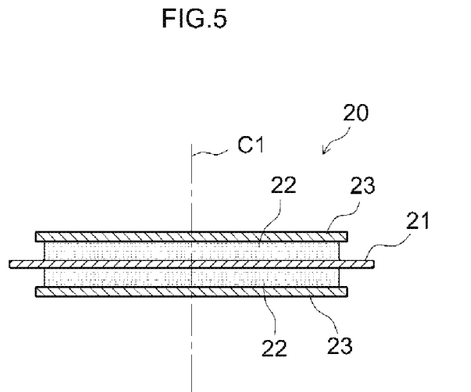
FIG. 5 is a cross-sectional view of the electrode sheet 20 that is to be cut.

FIG. 1 is a side view illustrating a cutting apparatus 10 proposed herein. FIG. 2 is a front view illustrating an arrangement of a first rotary blade 11 and a second rotary blade 12 of the cutting apparatus 10. FIG. 3 is a partially enlarged cross-sectional view illustrating a circumferential edge portion 11b (blade edge) of the first rotary blade 11. FIG. 4 is a plan view of an electrode sheet 20 that is to be cut. FIG. 5 is a cross-sectional view of the electrode sheet 20 that is to be cut.

The electrode sheet 20 to be cut herein is what is called a separator-integrated-type electrode sheet, as illustrated in FIGS. 4 and 5. The electrode sheet 20 includes a current collector foil 21, electrode active material layers 22, and separators 23. The current collector foil 21 is a long thin metal foil. Uncoated portions 21a, in which the electrode active material layer 22 is not formed, are provided near both lateral edges of the current collector foil 21. The uncoated portions 21a are set with a predetermined width along the length of the current collector foil 21. The active material layer 22 is formed on both faces of the current collector foil 21 except for the uncoated portions 21a. The separator 23 is affixed to a surface of the electrode active material layer 22. The separator 23 is a porous resin sheet that is laminated on the electrode active material layer 22. The separator 23 entirely covers the surface of the electrode active material layer 22. At the lateral edges of the electrode sheet 20, the separators 23 protrude from the electrode active material layers 22. In this embodiment, a cutting line C1 is set along the longitudinal centerline midway between the lateral edges of the electrode sheet 20. The cutting apparatus 10 cuts the electrode sheet 20 along the cutting line C1.

A specific example of the electrode sheet 20 is a negative electrode sheet for a lithium-ion secondary battery, in which the current collector foil 21 uses a copper foil. Each of the electrode active material layers 22 contains negative electrode active material particles made of, for example, graphite, and a binder. Each of the separators 23 is composed of a polyethylene porous film. A surface of the separator 23 is coated with an adhesive agent to impart adhesion capability so as to be bonded to the electrode active material layer 22.

Although not shown in the drawings, a positive electrode sheet for a lithium-ion secondary battery includes a current collector foil and an electrode active material layer formed on both faces of the current collector foil. The current collector foil uses an aluminum foil. The electrode active material layer, which is formed on both faces of the current collector foil, contains, for example, particles of a transition metal composite oxide containing lithium, serving as active material particles, a conductivity enhancing agent such as acetylene black, and styrene-butadiene rubber (SBR) serving as a binder. In this embodiment, the width of the electrode active material layer of the negative electrode sheet for lithium-ion secondary batteries is greater than that of the positive electrode sheet. In addition, in this embodiment, the negative electrode sheet employs a separator-integrated type electrode sheet for the negative electrode sheet, and the positive electrode sheet employs an electrode sheet that is not the separator-integrated type electrode sheet. It is also possible that the positive electrode sheet may be a separator-integrated-type electrode sheet and the negative electrode sheet may be an electrode sheet that is not the separator-integrated-type electrode sheet.

As illustrated in FIG. 1, the cutting apparatus 10 includes a first rotary blade 11, a second rotary blade 12, a drive device 13, and a conveyor device 14. In the example shown in FIG. 1, a separator-integrated type electrode sheet 20 as described above is shown as an example of work material.

The first rotary blade 11 is a disk-shaped rotary blade. The first rotary blade 11 includes a rotary shaft 11a provided at its center. The first rotary blade 11 includes a blade formed at its circumferential edge portion 11b.

The second rotary blade 12 is a disk-shaped rotary blade. The second rotary blade 12 includes a rotary shaft 12a provided at its center. The second rotary blade 12 includes a blade formed at its circumferential edge portion 12b.

As illustrated in FIGS. 2 and 3, the first rotary blade 11 and the second rotary blade 12 respectively include rough surface portions 11b1, 12b1 and smooth surface portions 11b2, 12b2. The width X (see FIG. 3) of the rough surface portions 11b1 and 12b1 is set to a predetermined width from the respective blade edges of the circumferential edge portions 11b and 12b of the first rotary blade 11 and the second rotary blade 12. Herein, the phrase "width of the rough surface portions 11b1 and 12b1" is intended to mean the radial width, measured from the circumferential edge of the blade, of the portion in which the rough surface portion 11b1 or 12b1 is formed, The smooth surface portions 11b2 and 12b2 are provided radially inward of the rough surface portions 11b1 and 12b1. Each of the smooth surface portions 11b2 and 12b2 has an arithmetical mean roughness less than that of the rough surface portions 11b1 and 12b1. In this embodiment, the rough surface portions 11b1 and 12b1 and the smooth surface portions 11b2 and 12b2 are respectively provided on both faces of the first rotary blade 11 and the second rotary blade 12. Although FIG. 3 shows the blade edge of the first rotary blade 11 only, the blade edge of the second rotary blade 12 has the same shape.

Herein, the arithmetical mean roughness Ra of the rough surface portions 11b1 and 12b1 is referred to as Ra1, as needed. The arithmetical mean roughness Ra of the smooth surface portions 11b2 and 12b2 is referred to as Ra2, as needed. Each of the rough surface portions 11b1 and 12b1 of the first rotary blade 11 and the second rotary blade 12 has a surface roughness Ra1 of greater than 0.5. In this embodiment, each of the smooth surface portions 11b2 and 12b2 of the first rotary blade 11 and the second rotary blade 12 has a surface roughness Ra2 of less than 0.2. Furthermore, in this embodiment, each of the smooth surface portions 11b2 and 12b2 includes a diamond-like carbon film formed thereon. Note that the first rotary blade 11 and the second rotary blade 12 may preferably be made of a material that is suitable for cutting electrode sheets, which may include a variety of materials. In this embodiment, each of the first rotary blade 11 and the second rotary blade 12 is made of high-speed steel (SKH), although not limited thereto. The blade edge angle α is set to 45 degrees. However, the blade edge angle α is not limited to 45 degrees. For example, the blade edge angle α may be set to 90 degrees, or about 40 degrees.

More specifically, the first rotary blade 11 and the second rotary blade 12 are provided with the rough surface portions 11b1 and 12b1 with a constant width from the blade edges provided at the circumferential edge portions. The smooth surface portions 11b2 and 12b2 are provided radially inward of the rough surface portions 11b1 and 12b1. Each of the rough surface portions 11b1 and 12b1 has a surface roughness Ra1 of greater than 0.5. The smooth surface portions 11b2 and 12b2 have smoother surfaces than the rough surface portions 11b1 and 12b1. That is, the portion nearer to the blade edge is rough, and the surface portion radially inward thereof is smooth. This means that the friction coefficient of the portion nearer to the blade edge is higher than the portion radially inward thereof. It is desirable that each of the rough surface portions 11b1 and 12b1 have a surface roughness Ra1 of, for example, from 0.5 to 1.0. Herein, the arithmetical mean roughness of the blade edge of the first rotary blade 11 may be measured, for example, with a contact-type surface roughness measurement instrument. Herein, the measurement conditions are as follows. The tracer is one made of diamond with a tip radius of 2 μm, the measurement force is set to 0.75 mN, and the measurement speed is set to 0.15 mm/s.

In this embodiment, each of the smooth surface portions 11b2 and 12b2 has a surface roughness Ra2 of less than 0.2. Furthermore, each of the smooth surface portions 11b2 and 12b2 includes a diamond-like carbon film formed thereon. For this reason, the friction coefficient of the surface portions 11b2 and 12b2 is significantly lower than that of the rough surface portions 11b1 and 12b1. Because the surfaces of the first rotary blade 11 and the second rotary blade 12 are smooth except for the rough surface portions 11b1 and 12b1 provided at the blade edges, foreign objects such as cuttings do not easily adhere to the first rotary blade 11 and the second rotary blade 12 during cutting.

The radial width X (see FIG. 3) of the rough surface portions 11b1 and 12b1 of the first rotary blade 11 and the second rotary blade 12 is less than the maximum radial width of the portion in which the circumferential edge portion 11b of the first rotary blade 11 and the circumferential edge portion 12b of the second rotary blade 12 overlap when viewed in the axial direction of the rotary shaft 11a of the first rotary blade 11 (hereinafter, this portion is referred to as a "lap portion L" as needed). According to the knowledge of the present inventor, the width X of the rough surface portions 11b1 and 12b1 should desirably be greater than the thickness of the separator, when the work material is a separator-integrated-type electrode sheet, as described above. Here, the width X of the rough surface portions 11b1 and 12b1 is a predetermined width (radial width) from the blade edge at which the rough surface portion 11b1 or 12b1 is formed. In this embodiment, the thickness of the separator affixed to the negative electrode sheet is about 20 μm. It is therefore desirable that the width X of the rough surface portions 11b1 and 12b1 be set to equal to or greater than 20 μm.

The first rotary blade 11 and the second rotary blade 12 may be fabricated in the following manner. First, a disk-shaped high-speed steel material is prepared, and a blade edge is formed at its circumferential edge portion. Thereafter, a surface of the high-speed steel material is ground to obtain a predetermined surface roughness of the smooth surface portions 11b2 and 12b2. Next, a circumferential edge portion in which a rough surface portion 11b1 or 12b1 is to be formed is masked, and a diamond-like carbon film is formed thereon. Thereafter, the smooth surface portion 11b2 or 12b2 with the diamond-like carbon film formed thereon is masked, and a blasting process is performed on the blade edge. This blasting process produces the rough surface portion 11b1 or 12b1 having the predetermined surface roughness. Because each of the rough surface portions 11b1 and 12b1 is roughened by a blasting process, each of the rough surface portions 11b1 and 12b1 is provided with process marks having very small surface irregularities of about 1 μm with respect to the reference surface. The diamond-like carbon film formed on the smooth surface portions 11b2 and 12b2 is formed by, for example, an arc ion plating technique. It is desirable that the thickness of the diamond-like carbon film be, for example, from 0.5 μm to 10 μm.

As illustrated in FIG. 1, the drive device 13 is a device that rotates the first rotary blade 11 and the second rotary blade 12. Herein, the drive device 13 retains the first rotary blade 11 and the second rotary blade 12 so that the rotary shaft 11a of the First Rotary Blade 11 and the Rotary shaft 12a of the second rotary blade 12 are aligned parallel to each other and the circumferential edge portions 11b and 12b partially overlap as viewed in an axial direction of the rotary shaft 11a of the first rotary blade 11. In addition, the drive device 13 rotates the first rotary blade 11 and the second rotary blade 12 that are retained in the just-described arrangement. Furthermore, as illustrated in FIG. 2, a clearance C is provided between the first rotary blade 11 and the second rotary blade 12. It is desirable that the clearance C be set in such a manner that the work material can be cut smoothly.

Although not shown in the drawings, the drive device 13 includes a holder that retains the rotary shaft 11a of the first rotary blade 11 and the rotary shaft 12a of the second rotary blade 12 in the above-described arrangement, and a drive mechanism that rotates the holder to thereby rotate the first rotary blade 11 and the second rotary blade 12. As illustrated in FIG. 1, the drive device 13 rotate the first rotary blade 11 and the second rotary blade 12 in mutually opposite directions. When viewed in the axial direction, the first rotary blade 11 and the second rotary blade 12 rotate so that their blade edges are brought closer to each other at one circumferential end La of the lap portion L, in which the circumferential edge portion 11b of the first rotary blade 11 and the circumferential edge portion 12b of the second rotary blade 12 partially overlap.

The conveyor device 14 is a device that conveys a work material. In this embodiment, the conveyor device 14 feeds the electrode sheet 20 as a work material toward the lap portion L, in which the circumferential edge portion 11b of the first rotary blade 11 and the circumferential edge portion 12b of the second rotary blade 12 partially overlap. More specifically, the electrode sheet 20 as a work material is fed toward one end La of the lap portion L at which the blade edges of the first rotary blade 11 and the second rotary blade 12 come close each other. In this embodiment, the electrode sheet 20 as a work material is a strip-shaped material. The electrode sheet 20 is cut along the cutting line C1 (see FIG.

2), which is set along the longitudinal centerline midway between the lateral edges of the electrode sheet 20.

In this embodiment, the conveyor device 14 guides the electrode sheet 20 toward a position at which the circumferential edge portion 11b of the first rotary blade 11 and the circumferential edge portion 12b of the second rotary blade 12 are brought to overlap with each other, in a so-called roll-to-roll process. The conveyor device 14 includes an edge sensor 14a, and also incorporates a position adjusting mechanism, a tension adjusting mechanism, and the like, although not shown in the drawings. As illustrated in FIG. 1, the conveyor device 14 supplies the electrode sheet 20 toward a position at which the circumferential edge portion 11b of the first rotary blade 11 and the circumferential edge portion 12b of the second rotary blade 12 are brought to overlap with each other, while adjusting the lateral position of the electrode sheet 20. Electrode sheets 20a and 20b, which have been cut apart by the first rotary blade 11 and the second rotary blade 12, are separated by changing the directions (angles) in which they are delivered after the cutting.

The drive device 13 rotates the first rotary blade 11 and the second rotary blade 12 in the same direction as the direction in which the electrode sheet 20 is fed by the conveyor device 14. In other words, in the lap portion L, in which the circumferential edge portion 11b of the first rotary blade 11 and the circumferential edge portion 12b of the second rotary blade 12 partially overlap, the blade edges of the first rotary blade 11 and the second rotary blade 12 advance in the same direction. The direction in which the blade edges of the first rotary blade 11 and the second rotary blade 12 advance is the same as the direction in which the electrode sheet 20 is fed to the lap portion L by the conveyor device 14.

In this embodiment, the rotational speed of the first rotary blade 11 and that of the second rotary blade 12 are the same. Herein, the rotational speeds of the first rotary blade 11 and the second rotary blade 12 are evaluated by peripheral speed. It is desirable that the rotational speed of the first rotary blade 11 and the second rotary blade 12 be set to the same as, or slightly higher than, the feed speed at which the electrode sheet 20 is fed. For example, the rotational speed V1 of the first rotary blade 11 and the second rotary blade 12 may be set to the same as, or slightly higher, for example, about 10% higher, than, the feed speed V2 at which the conveyor device 14 feeds the electrode sheet 20. In other words, the rotational speed V1 of the first rotary blade 11 and the second rotary blade 12 is set to be within the range $V2 \leq V1 \leq 1.1V2$.

As illustrated in FIG. 2, in the cutting apparatus 10, the width h1 of the clearance C and the width h2 of the lap portion L are set between the first rotary blade 11 and the second rotary blade 12 such that the work material is cut smoothly. As illustrated in FIG. 1, the first rotary blade 11 and the second rotary blade 12 are rotated at a predetermined rotational speed by the drive device 13 while maintaining the clearance C and the lap portion L.

The electrode sheet 20 as a work material is fed by the conveyor device 14 to the lap portion L, in which the first rotary blade 11 and the second rotary blade 12 partially overlap. The electrode sheet 20 is introduced into the lap portion L from one end La, at which the blade edges of the first rotary blade 11 and the second rotary blade 12 come close each other, when viewed in the axial direction. In this case, the electrode sheet 20 is fed toward the lap portion L of the first rotary blade 11 and the second rotary blade 12 while adjusting the cutting line C1 (see FIG. 4) of the electrode sheet 20 to the clearance C (see FIG. 2) between the first rotary blade 11 and the second rotary blade 12. The electrode sheet 20 is fed to the lap portion L at a predetermined feed speed.

Figure 6:
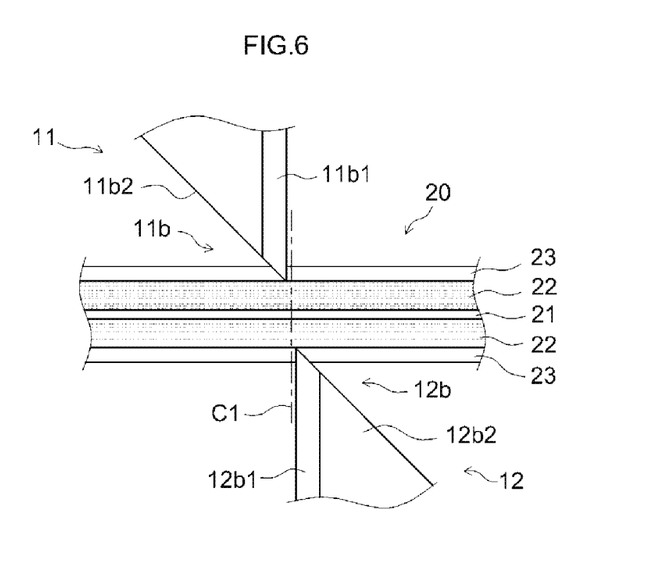
FIG. 6 is a cross-sectional view schematically illustrating a portion of the electrode sheet 20 at a position where the electrode sheet 20 has started to be cut.
Figure 7:
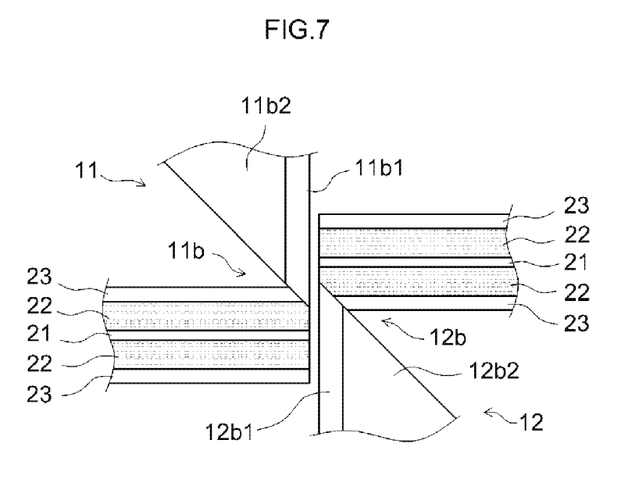
FIG. 7 is a cross-sectional view schematically illustrating a portion of the electrode sheet 20 at a position where the electrode sheet 20 has been cut.

FIG. 6 is a cross-sectional view schematically illustrating a portion of the electrode sheet 20 at a position where the electrode sheet 20 has started to be cut. The position at which the electrode sheet 20 has started to be cut is the one side La of the lap portion L, which is the position indicated by line VI-VI in FIG. 1. FIG. 7 is a cross-sectional view schematically illustrating a portion of the electrode sheet 20 at a location where the electrode sheet 20 has been cut. FIG. 7 shows a position at which the electrode sheet 20 has advanced further in the delivering direction in the lap portion L from the position shown in FIG. 6. Note that FIGS. 6 and 7 are views that are viewed from an opposite end to the end from which the electrode sheet 20 is introduced into the lap portion L.

According to the observation by the present inventor, the blade edges of the first rotary blade 11 and the second rotary blade 12 bite into the separators 23 on opposite faces of the electrode sheet 20 at the position at which the electrode sheet 20 has started to cut, as illustrated in FIG. 6. Next, as illustrated in FIG. 7, the first rotary blade 11 and the second rotary blade 12 bite into the electrode sheet 20 gradually more deeply. Under this condition, the electrode sheet 20 is pulled and sheared apart in the minute clearance C between the first rotary blade 11 and the second rotary blade 12.

Figure 8:
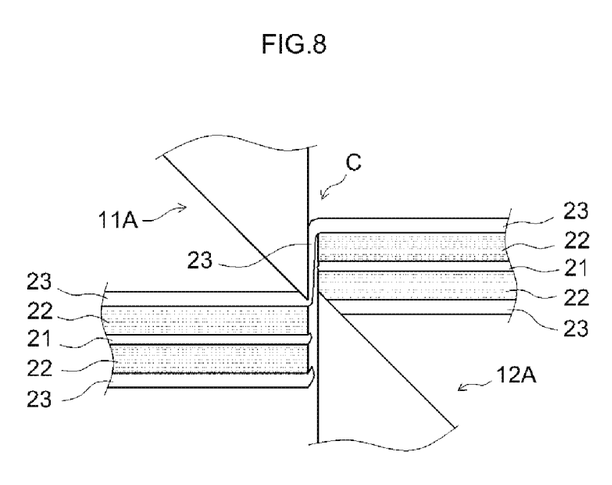
FIG. 8 is a cross-sectional view illustrating a typical example of defective cutting.

FIG. 8 is a cross-sectional view illustrating a typical example of defective cutting. The example shown in FIG. 8 illustrates a first rotary blade 11A and a second rotary blade 12A that have no rough surface portion at their blade edges. As illustrated in FIG. 8, the blade edges of the first rotary blade 11A and the second rotary blade 12A do not catch the separators 23 adequately. When the blade edges of the first rotary blade 11A and the second rotary blade 12A do not catch the separators 23 adequately, they tend to slip easily. In the example of FIG. 8, the upper one of the blade edges, the blade edge of the first rotary blade 11A, is slipping. When one of the blade edges of the first rotary blade 11A and the second rotary blade 12A slips, a portion of the separator 23 may jam into the clearance C between the first rotary blade 11A and the second rotary blade 12A, causing an event such that the separator 23 partially remains uncut, as illustrated in FIG. 8.

In contrast, the embodiments shown in FIGS. 6 and 7, the first rotary blade 11 and the second rotary blade 12 of the cutting apparatus 10 respectively include the rough surface portions 11b1 and 12b1 at their circumferential edge portions 11b and 12b, as illustrated in FIGS. 2 and 3. The rough surface portions 11b1 and 12b1 are provided with a predetermined width from the blade edges of the circumferential edge portions 11b and 12b. Each of the rough surface portions 11b1 and 12b1 has a surface roughness of greater than 0.5. Furthermore, the first rotary blade 11 and the second rotary blade 12 respectively include smooth surface portions 11b2 and 12b2 provided radially inward of the rough surface portions 11b1 and 12b1. Each of the smooth surface portions 11b2 and 12b2 has an arithmetical mean roughness less than that of the rough surface portions 11b1 and 12b1.

The rough surface portions 11b1 and 12b1 have a high arithmetical mean roughness, which means that they have rough surfaces. Therefore, the rough surface portions 11b1 and 12b1 have a high friction coefficient. The rough surface portions 11b1 and 12b1 show a high friction force when cutting a separator-integrated-type electrode sheet 20.

Because the first rotary blade 11 and the second rotary blade 12 include the rough surface portions 11b1 and 12b1 at the blade edges, the first rotary blade 11 and the second rotary blade 12 are able to adequately catch the separators 23 affixed to the surfaces of the electrode sheet 20. This means that the separators 23 on the opposite faces of the electrode sheet 20 are likely to be cut off smoothly. Moreover, the blade edges of the first rotary blade 11 and the second rotary blade 12 easily bite into the electrode sheet 20, so they do not easily slip from the electrode sheet 20. Then, the electrode sheet 20 is pulled at the minute clearance C provided between the first rotary blade 11 and the second rotary blade 12. As a result, the electrode sheet 20 is easily sheared apart smoothly. Thus, because the cutting apparatus 10 includes the rough surface portions 11b1 and 12b1 formed at the blade edges of the first rotary blade 11 and the second rotary blade 12, the cutting apparatus 10 is able to cut off the electrode sheet 20 smoothly even when the electrode sheet 20 is a separator-integrated-type electrode sheet.

In this embodiment, the rough surface portions 11b1 and 12b1 are roughened by a blasting process. The blasting process provides the surfaces with minute surface irregularities. As a result the blade edges of the first rotary blade 11 and the second rotary blade 12 have rough surfaces in the rough surface portions 11b1 and 12b1, so they catch the electrode sheet 20 adequately and cut the electrode sheet 20 smoothly.

According to the discovery made by the present inventor, it is desirable that the width X of the rough surface portions 11b1 and 12b1 be less than the maximum radial width of the lap portion L, in which the circumferential edge portion 11b of the first rotary blade 11 and the circumferential edge portion 12b of the second rotary blade 12 partially overlap. If the width X of the rough surface portions 11b1 and 12b1 is too wide, it is possible that dust or the like associated with the cutting process may enter the rough surface portions 11b1 and 12b1 and cause defective cutting. A part of the circumferential edge portion of the first rotary blade 11 that is radially inward of the lap portion L and a part of the circumferential edge portion of the second rotary blade 12 that are radially inward of the lap portion L both do not contribute to the cutting of the work material. The maximum radial width of the lap portion L is the length of the first rotary blade 11 and the second rotary blade 12 that substantially contributes to the cutting. It is desirable that the width X of the rough surface portions 11b1 and 12b1 be less than the maximum radial width of the lap portion L.

It is also desirable that the width X of the rough surface portions 11b1 and 12b1 be greater than the thickness of the separator 23, when a separator-integrated-type electrode sheet 20 is to be cut. That is, in order to cut the separator-integrated-type electrode sheet 20 smoothly, the separator 23 should be sheared apart by the rough surface portions 11b1 and 12b1. From such a viewpoint, it is desirable that the width X of the rough surface portions 11b1 and 12b1 be greater than the thickness of the separator 23.

Furthermore, the first rotary blade 11 and the second rotary blade 12 respectively include the smooth surface portions 11b2 and 12b2, which are provided radially inward of the rough surface portions 11b1 and 12b1 and have an arithmetical mean roughness less than that of the rough surface portions 11b1 and 12b1. Because the smooth surface portions 11b2 and 12b2 provided radially inward of the rough surface portions 11b1 and 12b1 have a low surface roughness, cuttings are unlikely to adhere to the smooth surface portions 11b2 and 12b2.

In this case, it is desirable that the smooth surface portions 11b2 and 12b2 have an arithmetical mean roughness of less than 0.2, for example. Furthermore, it is desirable that each of the smooth surface portions 11b2 and 12b2 include a diamond-like carbon film formed thereon. When the diamond-like carbon film is formed on each of the smooth surface portions 11b2 and 12b2, cuttings are more unlikely to adhere to the smooth surface portions 11b2 and 12b2. This serves to prevent defective cutting resulting from adhesion and deposition of cuttings onto the first rotary blade 11 and the second rotary blade 12.

The present inventor conducted tests for cutting a separator-integrated-type negative electrode sheet for a lithium-ion secondary battery. The prepared negative electrode sheet uses a copper foil (thickness 10 μm) as the current collector foil 21. The electrode active material layer 22 contains graphite particles serving as active material particles, and carboxymethylcellulose (CMC) and styrene-butadiene rubber (SBR) serving as binders. The thickness of the electrode active material layer 22 is 60 μm per one side. Each of the separators 23 is composed of a polyethylene porous film. A surface of the separator 23 is coated with polytetrafluoroethylene (PTFE) to impart adhesion capability, and the coated separator 23 is pressed with a pressing machine, so as to be bonded to the electrode active material layer 22. The thickness of the separator 23 is 20 μm per one side.

As illustrated in FIG. 1, the prepared separator-integrated-type negative electrode sheet is cut with the cutting apparatus 10, which is furnished with the first rotary blade 11 and the second rotary blade 12. Each of the first rotary blade 11 and the second rotary blade 12 prepared herein is made of high-speed steel (SKH). The blade edge angle is set to 45 degrees. As illustrated in FIG. 2, the width h2 of the lap portion L of the first rotary blade 11 and the second rotary blade 12 was set to 100 μm. The feed speed of the electrode sheet 20 was set at 30 m/min. The rest of the test conditions are shown in Table 1. The conditions that are not mentioned here are the same in all the tests.

TABLE 1

| Test | Rough surface portion width x (μm) | Rough surface portion surface roughness (Ra) | Blade rotational speed/feed speed | Clearance (μm) and cut results (G: good, D: defective) | | | | | | | |
|---|---|---|---|---|---|---|---|---|---|---|---|
| | | | | 0 | 5 | 10 | 15 | 20 | 25 | 30 | 35 |
| 1 | N/A | 0.2 | 1 | G | D | D | D | D | D | D | D |
| 2 | 50 | 0.5 | 1 | G | G | G | G | G | D | D | D |
| 3 | 50 | 0.5 | 1.1 | G | G | G | G | G | G | G | D |
| 4 | 50 | 1.0 | 1 | G | G | G | G | G | G | G | D |

Here, samples of the first rotary blade 11 and the second rotary blade 12 were prepared. The prepared samples were different in whether or not the samples had the rough surface portions 11b1 and 12b1 roughened by a blasting process and in arithmetical mean roughness Ra1 of the rough surface portions 11b1 and 12b1. Also, the rotational speed of the first rotary blade 11 and the second rotary blade 12 was varied. Then, the width h1 of the clearance C between the first rotary blade 11 and the second rotary blade 12 was gradually widened to confirm whether the electrode sheet 20 could be cut appropriately. Herein, the width h1 of the clearance C was gradually widened 5 μm at a time, starting from a clearance of 0 μm, to confirm whether or not the electrode sheet 20 was cut smoothly. Then, it was determined as "good" (G) when the separators 23 were cut off and the electrode sheet 20 was cut, and it was determined as "defective cutting" (D) when the separators 23 partially remained uncut.

In test 1, the rough surface portions 11b1 and 12b1 were not formed. Specifically, the surface roughness of the blade edges of the first rotary blade 11 and the second rotary blade 12 was set to the same as that of the smooth surface portions 11b2 and 12b2, an arithmetical mean roughness Ra of 0.2. The rotational speed (peripheral speed) of the first rotary blade 11 and the second rotary blade 12 was set to the same speed as the feed speed. In this case, the electrode sheet 20 was completely cut off when the width h1 of the clearance C was 0, but defective cutting occurred when the clearance C was set to equal to or greater than 5 μm.

In test 2, the rough surface portions 11b1 and 12b1 were formed. The width X (see FIG. 3) of the rough surface portions 11b1 and 12b1 was set to 50 μm. The surface roughness of the rough surface portions 11b1 and 12b1 was set to an arithmetical mean roughness Ra of 0.5. The rotational speed (peripheral speed) of the first rotary blade 11 and the second rotary blade 12 was set to the same speed as the feed speed. In this case, the electrode sheet 20 was cut off when the width h1 of the clearance C was in the range of from 0 μm to 20 μm. However, defective cutting occurred when the clearance C was set to equal to or greater than 25 μm. Comparison with test 1 indicates that defective cutting is made less likely to occur by providing the first rotary blade 11 and the second rotary blade 12 with the rough surface portions 11b1 and 12b1 even when the clearance C is provided.

In test 3, the rotational speed (peripheral speed) of the first rotary blade 11 and the second rotary blade 12 was set to be about 10% faster than the feed speed. The rest of the test conditions were the same as those in test 2. In this case, the electrode sheet 20 was cut off when the width h1 of the clearance C was in the range of from 0 μm to 30 μm. However, defective cutting occurred when the clearance C was set to equal to or greater than 35 μm. Comparison with test 2 indicates that the clearance C can be made wider by making the rotational speed of the first rotary blade 11 and the second rotary blade 12 higher than the feed speed.

In test 4, the surface roughness of the rough surface portions 11b1 and 12b1 was set to an arithmetical mean roughness Ra of 1.0. The rest of the test conditions were the same as those in test 2. In this case, the electrode sheet 20 was cut off when the width h1 of the clearance C was in the range of from 0 μm to 30 μm. However, defective cutting occurred when the clearance C was set to equal to or greater than 35 μm. Comparison with test 2 indicates that the clearance C can be made wider by setting the surface roughness of the rough surface portions 11b1 and 12b1 to about 1.0. Thus, in tests 3 and 4, it is possible to set the clearance C to about 30 μm, in cases where the thickness of the separator 23 is 20 μm. This serves to increase the tolerance for variations of the clearance C due to vibrations or the like, and accordingly increase the robustness of the apparatus. In other words, it is possible to cut the separator-integrated-type electrode sheet 20 stably and smoothly.

As demonstrated above, it is desirable that the first rotary blade 11 and the second rotary blade 12 of the cutting apparatus 10 be provided with the rough surface portions 11b1 and 12b1 at the blade edges. This serves to prevent defective cutting even when a clearance C is provided between the first rotary blade 11 and the second rotary blade 12.

The first rotary blade 11 and the second rotary blade 12 rotate in the same direction as the direction in which the electrode sheet 20 as the work material is fed to the lap portion L. The peripheral speed of the first rotary blade 11 and the second rotary blade 12 may be faster than the feed speed at which the electrode sheet 20 is fed to the lap portion L. This also serves to prevent defective cutting even when a clearance C is provided between the first rotary blade 11 and the second rotary blade 12. It is also preferable that the smooth surface portions 11b2 and 12b2 are provided over the entire surfaces except for the rough surface portions 11b1 and 12b1 provided at the blade edges. Furthermore, it is desirable that each of the smooth surface portions 11b2 and 12b2 include a diamond-like carbon film formed thereon.

Various embodiments of the cutting apparatus proposed herein have been described hereinabove. The embodiments of the cutting apparatus described herein do not limit the scope of the present invention, unless specifically stated otherwise.

What is claimed is:

1. A cutting apparatus comprising:
   a disk-shaped first rotary blade including a first rotary shaft provided at a center of the first rotary blade and a blade edge formed at a circumferential edge portion of the first rotary blade;
   a disk-shaped second rotary blade including a second rotary shaft provided at a center of the second rotary blade and a blade edge formed at a circumferential edge portion of the second rotary blade;
   a drive that retains and rotates the first rotary blade and the second rotary blade so that the first rotary shaft of the first rotary blade and the second rotary shaft of the second rotary blade are aligned parallel to each other and the circumferential edge portions partially overlap with each other as viewed in an axis direction of the first rotary shaft of the first rotary blade; and
   a conveyor that feeds a work material toward a lap portion in which the circumferential edge portion of the first rotary blade and the circumferential edge portion of the second rotary blade partially overlap, wherein
   each of the first rotary blade and the second rotary blade includes a rough surface portion and a smooth surface portion, each of the rough surface portions having a predetermined width from the blade edge of the respective circumferential edge portion and having an arithmetical mean roughness of greater than 0.5 μm, and each of the smooth surface portions provided radially inward of each of the rough surface portions and having an arithmetical mean roughness less than the arithmetical mean roughness of each of the rough surface portions,
   wherein the rough surface portion of the first rotary blade faces the rough surface portion of the second rotary blade and a predetermined clearance is provided between the rough surface portion of the first rotary blade and the rough surface portion of the second rotary blade that face each other, wherein each of the rough surface portions is roughened by a blasting process.

2. The cutting apparatus according to claim 1, wherein each of the smooth surface portion has an arithmetical mean roughness of less than 0.2 μm.

3. The cutting apparatus according to claim 1, wherein each of the smooth surface portion includes a diamond-like carbon film formed thereon.

4. The cutting apparatus according to claim 1, wherein:
the first rotary blade and the second rotary blade rotate in the same direction as a direction in which the work material is fed to the lap portion; and
a peripheral speed of the first rotary blade and the second rotary blade is faster than a speed at which the work material is fed to the lap portion.

5. A cutting apparatus comprising:
a disk-shaped first rotary blade including a first rotary shaft provided at a center of the first rotary blade and a blade edge formed at a circumferential edge portion of the first rotary blade;
a disk-shaped second rotary blade including a second rotary shaft provided at a center of the second rotary blade and a blade edge formed at a circumferential edge portion of the second rotary blade;
a drive that retains and rotates the first rotary blade and the second rotary blade so that the first rotary shaft of the first rotary blade and the second rotary shaft of the second rotary blade are aligned parallel to each other and the circumferential edge portions partially overlap with each other as viewed in an axis direction of the first rotary shaft of the first rotary blade; and
a conveyor that feeds a work material toward a lap portion in which the circumferential edge portion of the first rotary blade and the circumferential edge portion of the second rotary blade partially overlap, wherein
each of the first rotary blade and the second rotary blade includes a rough surface portion and a smooth surface portion, each of the rough surface portions having a predetermined width from the blade edge of the respective circumferential edge portion and having an arithmetical mean roughness of greater than 0.5 μm, and each of the smooth surface portions provided radially inward of each of the rough surface portions and having an arithmetical mean roughness less than the arithmetical mean roughness of each of the rough surface portions,
wherein the rough surface portion of the first rotary blade faces the rough surface portion of the second rotary blade and a predetermined clearance is provided between the rough surface portion of the first rotary blade and the rough surface portion of the second rotary blade that face each other,
wherein a radial width of each of the rough surface portions is less than a maximum radial width of the lap portion in which the circumferential edge portion of the first rotary blade and the circumferential edge portion of the second rotary blade partially overlap.

* * * * *